Patented Oct. 1, 1929

1,730,061

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

ETHER OF PROPYLENE GLYCOL AND PROCESS FOR MAKING THE SAME

No Drawing.   Application filed July 20, 1925. Serial No. 44,929.

The invention relates to ethers of propylene glycol and processes for making such ethers.

The compounds comprised in the invention may be regarded as derived from propylene glycol, $C_3H_6(OH)_2$, by converting one or both of its hydroxyl groups to ether linkages and connecting thereto a corresponding number of alkyl or aryl groups. Examples of such compounds are:

$C_3H_6OHOCH_3$
monomethyl ether of propylene glycol $C_3H_6OHOC_6H_5$
monophenyl ether of propylene glycol $C_3H_6(OC_2H_5)_2$
diethyl ether of propylene glycol.

Two general methods for preparing compounds of the above class will be described. When the desired product is a mono-ether, the preferred method of production is by the reaction of propylene oxid, $C_3H_6O$, with the appropriate alcohol, e. g., $C_3H_6O + C_2H_5OH = C_3H_6OH \cdot OC_2H_5$
ethyl alcohol $C_3H_6O + C_6H_5CH_2OH = C_3H_6OH \cdot OCH_2C_6H_5$
benzyl alcohol $C_3H_6O + C_6H_5OH = C_3H_6OH \cdot OC_6H_5$
phenol In preparing the methyl ether of propylene glycol, for example, methyl alcohol is mixed with propylene oxid at a temperature below the boiling point of the mixture. The mixture is sealed in an autoclave and heated to bring about the reaction. The reaction proceeds more rapidly as the temperature is increased, and the time required for the reaction to go to completion is correspondingly shortened. The increased temperature causes an increase in pressure, the pressure being highest at first and subsequently diminishing as the reacting materials are converted into the less volatile ether. Temperatures of 100° C. to 200° C., giving rise to maximum pressures of 100 to 500 pounds or more per square inch are suitable, but either higher or lower temperatures may be used. The reaction may be completed in five hours or less if a sufficiently high temperature is used.

A considerable excess of the alcohol may advantageously be employed to secure a more complete utilization of the propylene oxid, and to minimize the formation of undesired by-products. The ether is separated from the unconsumed reagents and from the by-products by fractional distillation.

The di-ethers may be prepared from propylene glycol or from propylene chlorhydrin. The following equations represent typical reactions by which di-ethers are formed:

$C_3H_6(OH)_2 + 2NaOH + (C_2H_5)_2SO_4 = C_3H_6(OC_2H_5)_2 + Na_2SO_4 + 2H_2O$
propylene glycol / sodium hydroxid / diethyl sulphate / diethyl ether of propylene glycol / sodium sulphate / water $C_3H_6OH \cdot Cl + 3NaOH + (C_2H_5)_2SO_4 = C_3H_6(OC_2H_5)_2 + NaCl + Na_2SO_4 + 2H_2O$.
propylene chlorhydrin In either of the reactions last described a portion of the propylene compound is converted to the mono-ether. The yield of di-ether is raised by increasing the quantity of diethyl sulphate used beyond that required by the above equation. The alkali should be present in quantity at least sufficient to decompose completely the diethyl sulphate, and to decompose the chlorhydrin, if used. The reacting materials are preferably anhydrous or nearly so, though the presence of water appears to have no detrimental effect other than to decrease the yield.

The reaction mixture is boiled under a reflux condenser for three hours, more or less, and the product is then distilled under reduced pressure. It may thereafter be redistilled, at normal or reduced pressure, to effect its purification and a sufficient separation of the mono- and di-ethers.

The ethers of propylene glycol are miscible with most of the common solvents, and either alone or in mixtures are valuable solvents for many difficultly-soluble substances, particularly for gums, resins, and cellulose esters. When prepared for industrial use, it will often be unnecessary to prepare a single ether in pure form. A mixture of the mono- and di-ethers is highly useful as a solvent or reagent for many purposes. Mixtures of the ethers of propylene glycol with ethers of the other glycols, such as the ethylene and butylene glycols, are also useful for many purposes, and when such mixtures can be used the purification of the materials from which the ether is to be formed may be avoided. Thus a mixture of olefins may be converted without separation into a mixture of chlorhydrins, glycols, or olefin oxids, and these mixtures may be utilized in the processes described above for producing a mixture of ethers.

The boiling points of some of the mono-ethers of propylene glycol, at 736 mm. pressure, are as follows:

|  | Deg. C. |
|---|---|
| Methyl | 122.8 |
| Ethyl | 133.0 |
| Isopropyl | 141.5 |
| Normal propyl | 150.0 |
| Isobutyl | 161.3 |
| Normal butyl | 170.6 |
| Isoamyl | 183.3 |

The structural formulas of the propylene glycol ethers are not certainly known, but the mono-ethers are believed to be represented by the formula $$\begin{array}{c} CH_3 \\ | \\ CHOH \\ | \\ CH_2OR. \end{array}$$

The di-ethers are distinguished from the acetals of the same empirical formula by having the ether linkages on different carbon atoms.

The alkyl ethers of propylene glycol have not been prepared heretofore, so far as I am aware. I therefore claim as new substances compounds having the type formula

where R' is either a hydrogen atom or an alkyl group, R is an alkyl group, and OR and OR' are attached to different carbon atoms.

I claim:

1. Propylene glycol ether represented by the formula

R' being an alkyl group or hydrogen, R being an alkyl group, and the OR and OR' groups being attached to different carbon atoms.

2. Monomethyl ether of propylene glycol.

In testimony whereof, I affix my signature.

JOSEPH G. DAVIDSON.